Oct. 31, 1967 W. R. JOHNSON 3,350,511

SPEED INDICATOR AND CONTROL SYSTEM

Filed Oct. 1, 1962 3 Sheets-Sheet 1

INVENTOR
Wayne R. Johnson
By Keith D. Beecher
Attorney

INVENTOR:
Wayne R. Johnson
By Keith D. Beecher
Attorney

Oct. 31, 1967 W. R. JOHNSON 3,350,511

SPEED INDICATOR AND CONTROL SYSTEM

Filed Oct. 1, 1962

3 Sheets-Sheet 3

INVENTOR:
Wayne R. Johnson

By Keith D. Beecher
Attorney

United States Patent Office 3,350,511

Patented Oct. 31, 1967

3,350,511

SPEED INDICATOR AND CONTROL SYSTEM

Wayne R. Johnson, Los Angeles, Calif., assignor, by mesne assignments, to Minnesota Mining and Manufacturing Company, St. Paul, Minn., a corporation of Delaware Filed Oct. 1, 1962, Ser. No. 227,306
9 Claims. (Cl. 179—100.2)

The present invention relates to speed indicating and control systems; and it relates more particularly to an improved electrical control system of the type disclosed and claimed in copending application Serial No. 209,690, now abandoned, filed in the name of the present inventor on July 13, 1962, and assigned to the present assignee.

The control system of the present invention, like the control system of the copending application, is capable of generating electrical pulses indicative of the linear or angular speed of a member or vehicle; and the system of the invention also includes, for example, a control system for utilizing the pulses to control the speed of the member or vehicle, so as to maintain the speed thereof constant within precise tolerances.

The system of the present invention finds particular utility in the field of magnetic recorders, and the invention will be described in such an environment. However, it will become evident as the description proceeds, that the invention has general utility for the indication of linear and rotational speeds, and for the generation of control signals for regulating and maintaining such speeds at a predetermined constant value.

As pointed out in the copending application, it is most important in magnetic recorders for the magnetic tape to be drawn past the recording head with constant linear velocity. It is equally important in the reproduction of the recorded intelligence for the magnetic tape to be drawn past the play-back, or reproduce head, with a constant linear velocity.

Any variation in the speed of the magnetic tape, either during the recording of the information, or during play-back, produces a spurious frequency modulation in the recorded or reproduced signals.

It is evident, therefore, that if the speed of the magnetic tape during recording or reproduction varies at some rate, a constant frequency signal will not be reproduced as a constant frequency. Instead, the frequency of the reproduced tone will vary above and below the normal pitch depending on the extend of the speed variations of the magnetic tape. This variation in the tone creates serious distortions in the reproduced signals.

Many attempts have been made in the past to assure that the magnetic tape in the magnetic recorder will be drawn a a constant speed past the record and play-back heads. However, these prior art attempts have usually involved the use of expensive and complicated speed regulating equipment, and expensive high inertia and excessively heavy drive mechanisms for the recording medium.

The copending application, on the other hand, discloses and claims an improved speed control system for use in magnetic tape recorders for controlling the speed of the magnetic tape therein. The control system of the copending application is accurate and precise in its operation and is capable of controlling the drive of the magnetic tape and to hold the speed of the tape constant within extremely close tolerances.

The embodiment described in the copending application includes a combined record-reproduce electro-magnetic transducer head. The combined transducer head of the copending application is constructed to have a record section and a reproduce section. The record section of the combined head responds to an applied electric signal to record a corresponding magnetic recording on the tape. The reproduce section of the combined head of the copending application responds to the recording as the tape moves across the head to produce an output signal.

The time interval between the application of the input signal to the combined head and the production of the corresponding output signal is a measure of the tape speed, and this interval is used, in the manner fully described in the copending application, to derive a control signal for the drive mechanism associated with the magnetic tape, so that the drive of the tape may be held constant within extremely close tolerances.

The control system of the present invention is generally similar in its concept to the control system described and claimed in the copending application. However, simplifications are realized in the control system of the invention in that a two-section specially constructed record-reproduce head of the copending application is not required. Instead, a head having a single energizing coil is used in the system of the invention, with the input signal being introduced across the coil and the output signal being later produced across the same coil. Inter-action between the inputs and outputs of the control system is prevented by use of appropriate gate circuits, as will be described.

It is, accordingly, an object of the present invention to provide an improved speed control system which is relatively simple and inexpensive to construct, and which may be easily incorporated into magnetic recorders.

Yet another object of the invention is to provide such an improved speed control system which is capable of accurately and precisely maintaining the speed of a recording mechanism at a constant value.

A more general object of the invention is to provide an improved system for indicating and/or controlling the angular or linear speed of a member in a simple and expeditious manner, and without any requirement for specially constructed transducer heads, or the like.

The features of the invention which are believed to be new are set forth in the claims. Other objects and advantages of the invention, however, will become apparent from a consideration of the following specification, when taken in conjunction with the accompanying drawings, in which:

Figure 1:
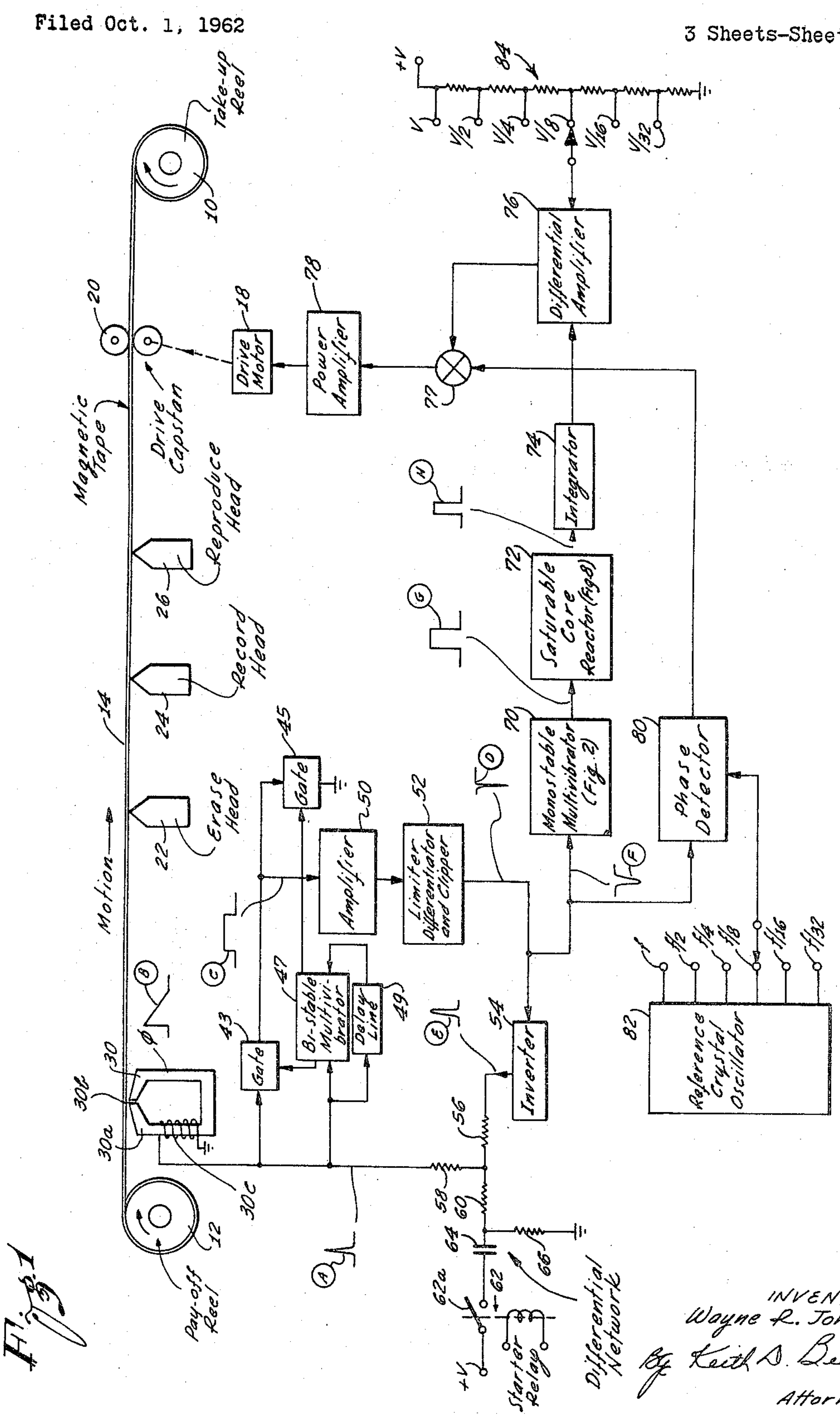
FIGURE 1 is a schematic diagram, partly in block form, illustrating a magnetic recorder which is constructed to incorporate one embodiment of the improved control system of the present invention.

The magnetic recorder and reproducer system and mechanism illustrated in FIGURE 1 includes a usual take-up reel 10 and pay-off reel 12. These reels are mounted in the recorder mechanism in a manner well understood by the art, and a magnetic recording tape 14 is drawn along a given path from the pay-off reel 12 to the take-up reel 10.

The magnetic tape is drawn along the given path by means, for example, of a drive capstan 16. The drive capstan is rotatably driven by a drive motor, represented by the block 18, and it is disposed adjacent one side of the tape 14. A rotatable idler puck 20 may be selectively moved from a release position to an operational position against the opposite side of the tape 14 from the drive capstan 16. Whenever the puck 20 is moved into its operational position, the tape is squeezed between it and the drive capstan 16, and the capstan is caused to draw the tape along its given path. This arrangement of the puck and drive capstan, of course, is well understood in the prior art.

The system of FIGURE 1 includes the usual erase head 22, record head 24, and play-back head 26. These heads are in the form of electro-magnetic transducers of known construction. The erase head 22 functions in conjunction with an associated circuit (not shown) in a manner to remove any magnetic recordings previously recorded on the tape 14. The record head 24 responds to an input signal from an associated circuit (not shown) to record intelligence on the tape 14, and the play-back head 26 senses the recorded intelligence on the tape to produce electrical signals corresponding thereto. The transducer heads 22, 24 and 26, and their associated circuitry, are also well known to the electro-magnetic recorder art.

The embodiment of the invention illustrated in FIGURE 1 is intended to be incorporated into a typical magnetic recorder, such as described above, and the system is illustrated as controlling the speed of the drive motor 18, so that the drive capstan 16 will drive the magnetic recording tape 14 at a constant speed.

As is well known, both the pay-off reel 12 and the take-up reel 10 usually have electric motor/braking mechanisms associated with them. These mechanisms serve to maintain the magnetic tape 14 under tension between the two reels, as the tape is unreeled from the pay-off reel 12 and reeled onto the take-up reel 10.

The drive motor 18 is controlled by the control system of the invention so that under all conditions the tape 14 is driven by the drive capstan 16 at a constant speed, even though such speed constancy is not within the normal capablities and characteristics of the drive motor 18 itself.

In the practice of the embodiment of the invention illustrated in FIGURE 1, a combined record-reproduce head 30 is positioned in magnetically coupled relationship with a track on the magnetic tape 14. The record-reproduce head 30 may have a usual construction. The head includes a usual magnetic core **30*a* with an air gap 30*b*. The tape 14 being drawn across the air gap. The head 30 also includes a single energizing coil 30*c*. The signals to be recorded on the tape are introduced to the coil 30*c*, and the signals reproduced by the head also appear across the coil 30*c***, as will be described in more detail subsequently.

It will be appreciated that the signal recorded on the magnetic tape 14 by the combined record-reproduce head 30, and later sensed thereby, may be later erased by the erase head 22, so that the particular track on the tape on which the signal is recorded may be used for recording other intelligence. If so desired, however, the particular track utilized by the record-reproduce head 30 for recording the signal may be unaffected by the erase head 22, so that the signal recorded on the tape by the head 30 may be later used for tape control purposes in a subsequent reproducing system.

One side of the winding **30*c* of the transducer head 30 is grounded, and the other side is connected through a gate circuit 43 to an amplifier 50. The gate circuit 43 is also connected to a gate circuit 45** whose output terminal is grounded.

The gate circuits 43 and 45 are constructed in any appropriate known manner, and these gate circuits are controlled by a bi-stable relaxation oscillator, such as a bi-stable multivibrator 47. The system is such that when the multivibrator 47 is triggered to a first stable state, the gate circuit 43 is rendered conductive and the gate circuit 45 is rendered non-conductive. For this operating condition, the signal appearing across the coil **30*c* may be introduced to the input of the amplifier 50**.

For a second operating state of the multivibrator 47, the gate circuit 43 is disabled and the gate circuit 45 is rendered conductive. For this latter operational state, the input to the amplifier 50 is grounded by the gate circuit 45, and the application of signals to the input of the amplifier 50 is blocked by the gate circuit 43.

The amplifier 50 is connected to a limiter, differentiator and clipper network 52. The network 52 functions to limit, differentiate and clip the signal applied thereto by the amplifier 50. The network 52 is connected to an inverter stage 54 which, in turn, is connected through a resistor 56 to a pair of resistors 58 and 60. The resistor 58 is connected to the ungrounded side of the winding **30*c*, and this resistor is also connected to one of the input terminals of the multivibrator 47, and through a delay line 49** to the other input terminal of the multivibrator.

The system of FIGURE 1 includes a start relay 62 which has a pair of normally open contacts **62*a*. The contacts 62*a* are connected between the positive terminal of a unidirectional voltage source (V) and a capacitor 64. The capacitor 64 is connected to the resistor 60 and to a grounded resistor 66. The capacitor 64 and resistor 66 are connected as a differentiating network; whereas the resistors 56, 58 and 60** are connected as a summing network.

The limiter, differentiator and clipper network 52 is connected to a monostable multivibrator 70 which, in turn, is connected to a saturable core reactor 72. The saturable core reactor 72 is connected to an integrator 74 which, in turn, is connected to a differential amplifier 76. The output of the differential amplifier 76 is applied to a summing network 77. The summing network 77 is connected to a power amplifier 78 which supplies power to the drive motor 18.

The drive motor 18 may be a direct current type using a permanent magnet field. The direct current driving power applied to the motor by the power amplifier 78 is controlled in such a manner that the speed of the motor 18 is controlled to cause the drive capstan 16 to draw the tape 14 at a constant speed through the mechanism.

The limiter, differentiator and clipper network 52 is also coupled to a phase detector 80. This phase detector, in turn, is coupled to a reference crystal oscillator 82, and it provides a direct current output for the power amplifier 78 through the summing network 77.

The system including the monostable multivibrator 70, the saturable core reactor 72, and associated elements is a frequency control system. The system including the phase detector 80 and the reference crystal oscillator 82 is a phase control system. As mentioned in the copending application, either of these systems may be used independently to control the speed of the motor 18, or both may be used together, as shown in FIGURE 1.

The saturable core reactor 72 produces output pulses having a uniform power content, and these pulses are integrated in the integrator 74 to produce a direct current control voltage. The direct current control voltage from the integrator 74 is compared with a standard direct current voltage in the differential amplifier 76, and the resulting error control voltage is applied to the power amplifier 78 by way of the summing network 77.

As shown in FIGURE 1, the standard direct current voltage for the differential amplifier 76 may be obtained from an appropriate tap on a potential divider network 84 connected across a standard reference voltage source (V). This potential divider network 84 provides different standard voltages, and a manual adjustment of its movable arm enables the voltages to be selectively applied to the differential amplifier 76. The selection of the standard voltage for the differential amplifier 76 will depend upon the desired constant speed at which the magnetic tape 14 is to be driven.

The frequency comparison system formed by the units 70, 72, 74 and 76 provides for high stability in the system. However, the phase comparison system of the phase detector 80 and the reference crystal oscillator 82 provides a finer control. When the two systems are used together, as shown in FIGURE 1, the frequency comparison system is used as a coarse adjustment to bring the over-all system into over-all phase and frequency lock, and the fine control is provided by the phase comparison system.

The phase detector 80 compares the phase of the pulses introduced to the system with a reference signal derived from the reference crystal oscillator 82. The crystal oscillator 82, like the potential divider 84, has a plurality of different taps, so that the selected frequency of the reference signal corresponds to the desired speed at which the magnetic tape 14 is to be drawn through the system.

In the operation of the system of FIGURE 1, the start relay 62 is used to initiate the operation. When this relay is energized, the closure of the contact 62*a* causes a step function of voltage to appear across the capacitor 64. This voltage is differentiated in the network 64 and 66, and it appears as a narrow pulse "A" across the energizing coil 30*c* of the transducer head 30. The resulting current flow through the coil 30*c* provides a flux through the magnetic core 30*a* and across the air gap 30*b*. This flux causes a corresponding magnetic pulse to be recorded on the magnetic tape 14.

During the above-mentioned application of the pulse "A" to the energizing winding 30*c*, the gate 43 is disabled and the gate 45 is rendered conductive by the bi-stable multivibrator 47. This blocks any application of the pulse to the amplifier 50. However, the pulse "A" is also applied to the bi-stable multivibrator 47 so that immediately after its application to the energizing winding 30*c*, the bi-stable multivibrator 47 causes the gate 43 to become conductive and the gate 45 to become disabled.

As the recorded pulse is drawn across the air gap 30*b* by the motion of the tape 14, it produces a flux variation in the core 30*a* as shown by the curve "B". The flux in the core decreases from a peak value in a linear manner as the recorded magnetic signal moves across the gap 30*b*. It is apparent that the rate of decrease of the flux is a function of the speed at which the recorded signal is drawn across the air gap which, in turn, corresponds to the speed of the magnetic pulse.

The flux variation shown by the curve "B" produces an electrical signal pulse "C" across the winding 30*c*, and since the gate 43 is now conductive, the pulse "C" is applied to the amplifier 50. At this time, the delay line 49 applies a delayed pulse to the other input terminal of the bi-stable multivibrator 47 to return the multivibrator to its original stable state, so as to block the gate circuit 43 and render the gate circuit 45 conductive.

The width of each individual pulse "C," therefore, is a measure of the speed at which the magnetic tape 14 is drawn across the air gap 30*b*. The pulse "C" is amplified by the amplifier 50 and is applied to the limiter, differentiator and clipper network 52. The network 52 serves first as an amplitude limiter for the amplified pulse "C" to provide a rectangular wave signal. The network 52 then serves to differentiate the rectangular wave signal to produce positive-going and negative-going pulses corresponding respectively to the leading and trailing edge of the pulse "C."

Finally, the network 52 serves to clip the positive-going portions of the differentiated signal, so as to produce a negative-going pulse "D" corresponding to the trailing edge of the pulse "C". The negative-going pulses "D" are applied to the inverter 54 which inverts the pulses and introduces them as positive-going pulses "E" to the recording circuit. It will be remembered that the gate 43 is now disabled, so that each pulse "E" is applied to the energizing winding 30*c* to re-initiate the cycle described above.

Therefore, a circulation of pulses is set up in the above-described manner as the tape 14 is drawn across the air gap 30*b* of the head 30. The head 30 serves to record the circulated pulses on the tape 14, and subsequently to sense the pulses so as to maintain the circulation thereof. This circulation results in a series of pulses "F" being introduced by the network 52 to the monostable multivibrator

70 and to the phase detector 80. Also, these pulses "F" have a repetition rate corresponding to the speed at which the magnetic tape 14 is drawn across the air gap 30*b*.

The pulses "F" produced by the network 52 are split into two paths, the first path provides the feedback circulation to the head 30 so that pulse circulation may be maintained at a repetition rate corresponding to the speed of the tape 14. The second path provides for the application of the pulses "F" to the phase and frequency comparison system 70, 72, 74, 76 and 80, 82.

As described in detail in the copending application, the pulses "F" are applied to the monostable multivibrator 70, and they trigger the multivibrator and cause it to produce corresponding wider pulses, such as the pulse "G." The multivibrator 70 produces a pulse "G" in response to each triggering by the input pulse "F." The pulse "G" is broader than the pulse "F," and it is applied to the saturable core reactor 72.

The saturable core reactor serves to produce a narrower pulse "H" in response to each pulse "G." The pulses "H" are controlled by the saturable core reactor so that each successive pulse "H" may have precisely the same power content as the preceding pulse.

The pulses "H" from the saturable core reactor 72 are integrated in the integrator 74 to provide a direct current control voltage. This control voltage varies as a precise function in accordance with variations in the repetition frequency of the pulses "F." The control voltage is compared with a reference voltage from the network 84 in the differential amplifier 76 to introduce an error voltage for application to the power amplifier 78.

Any tendency for the speed of the magnetic tape 14 to vary causes a corresponding variation in the repetition rate of the pulses "F." This variation is sensed by the above-described control system which applies an error voltage to the power amplifier 78. The drive motor is controlled, therefore, to change its speed in a direction to compensate for such a tendency, so that the over-all drive of the magnetic tape 14 is maintained constant.

As also described in the copending application, the phase detector 80 functions in known manner to compare the pulses "F" with the selected reference frequency from the reference crystal oscillator 82. The phase detector produces a direct current voltage which has amplitude variations precisely reflecting any variations in the repetition frequency of the pulses "F." This latter voltage is used as a fine control in the illustrated embodiment, so that the drive motor 18 is precisely controlled in a manner such that the tape 14 is driven at a constant linear speed.

All the units shown in block form in FIGURE 1 are well known to the art, and many types of known circuits may be used to constitute the individual units. Therefore, it is believed that a detailed description of such known circuitry is unnecessary for the understanding of the present invention.

Figure 2:
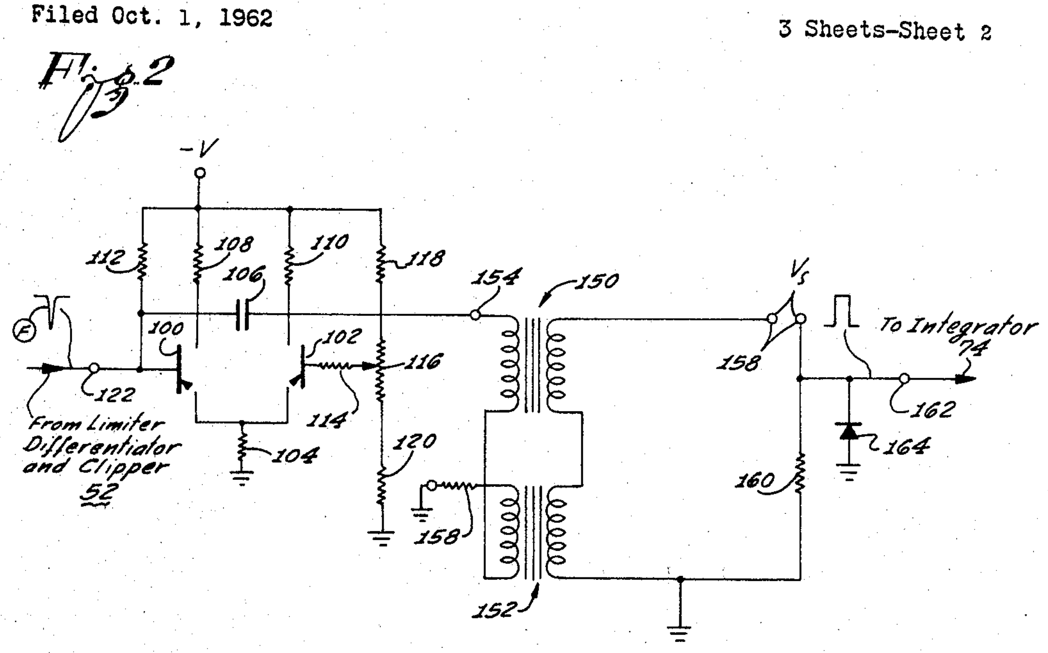
FIGURE 2 is a circuit diagram of certain electrical networks illustrated in block form in the system of FIGURE 1.

The circuitry of FIGURE 2 includes appropriate circuits for the monostable multivibrator 70 and for the saturable core reactor 72.

The monostable multivibrator 70 includes a pair of PNP transistors 100 and 102. The emitters of the transistors are connected to a common grounded resistor 104. The collector of the transistor 102 is coupled back to the base of the transistor 100 through a capacitor 106.

The collectors of the transistors 100 and 102 are connected to resistors 108 and 110 respectively which, in turn, are connected to the negative terminal of a unidirectional voltage source V. The base of the transistor 100 is also connected to the negative terminal of the source V through a resistor 112. The base of the transistor 102 is connected through a resistor 114 to the movable arm of a potentiometer 116. The potentiometer 116 is included in a voltage divider connected between the negative terminal of the source V and ground. The voltage divider includes the series combination of the potentiometer 116 and a pair of resistors 118 and 120.

The monostable multivibrator 70 is normally in a state in which the transistor 100 is fully conductive, and the transistor 102 is non-conductive. The negative-going pulses "F" from the limiter, differentiator and clipper network 52 are introduced, by way of an input terminal 122, to the base of the transistor 100. Each pulse F causes the transistor 100 to swing to a conductive state to discharge the capacitor 106. This produces a cumulative effect in which the transistor 100 becomes non-conductive, and the transistor 102 becomes fully conductive.

In the manner described briefly above, the monostable multivibrator 70 is triggered to its second state which is unstable, and it remains in that state until the charge on the capacitor 106 is sufficient to return the multivibrator to its first stable state. This results in the pulse "G" being generated by the monostable multivibrator 70.

The pulse "G" is initiated by the input pulse "F," and it has a greater duration than the pulse "F." However, the trailing edge of the pulse "G" is not precisely determined, and that pulse is applied to the saturable core reactor 72 so as to produce the narrower pulse "H," the later pulse having a precisely controlled duration so as to have a precisely uniform power content from one pulse to the next.

The saturable core reactor 72 is illustrated as including a pair of transformers 150 and 152. The primary windings of the transformers are connected in series opposition, as shown. The other terminal of the primary of the transformer 150 is connected to an input terminal 154. The other terminal of the primary of the transformer 152 is connected to a grounded resistor 156. The secondaries of the transformers 150 and 152 are connected in series. The other side of the secondary of the transformer 150 is connected to one of a pair of input terminals 158. The other side of the secondary of the transformer 152 is grounded. The other terminal 158 is connected to a grounded load resistor 160 and to an output terminal 162. A diode 164 is connected between the terminal 162 and ground. The pulse "H" appears at the output terminal 162.

The transformers 150 and 152 are constructed so that their cores are readily saturable by the currents in their windings. The cores are constructed of any suitable known magnetic material to achieve the desired saturation characteristics; such material having sharp saturation characteristics, high permeability and nearly rectangular flux density vs. magnetizing force characteristics.

In the interval between successive pulses "G," the cores of the transformers 150 and 152 are not quite saturated, and their secondaries act as a large inductance in the load circuit. An alternating current signal $V_s$ is applied across the terminals 158. Due to the high impedance of the secondary windings, the flow of this signal through the load impedance 160 is reduced essentially to zero, so that essentially zero signal appears at the output terminal 162.

In the presence of an input pulse "G," on the other hand, the cores of the transformers 150 and 152 are driven to saturation during part of each cycle of the alternating current signal $V_s$. That is, the transformer 150 core is driven to saturation by the positive peaks of the alternating current signal $V_s$, and the core of the transformer 152 is driven to saturation by the negative peaks. This action causes the impedance of the secondary windings to drop to a small fraction of their unsaturated value when the corresponding cores are driven to saturation, so that a relatively high current flows through the resistor 160 to produce output pulses such as the pulse "H."

It will be appreciated that negative-going pulses are also produced due to the saturation of the transformer 152. However, these later pulses may be by-passed to ground by the diode 164.

The monostable multivibrator 70 and saturable reactor 72 cooperate, therefore, to transform the pulses "F" into control pulses "H." The action of the saturable core reactor 72 is extremely precise and accurate, so that each of the control pulses "H" in the series have exactly the same power content. This means that when the pulses "H" are subsequently integrated by the integrator 74 the resulting direct current control voltage is a precise measurement of the repetition frequency of the pulses "F," and this control voltage does not include spurious variations due to variations in width of the pulses.

Figures 3, 4:
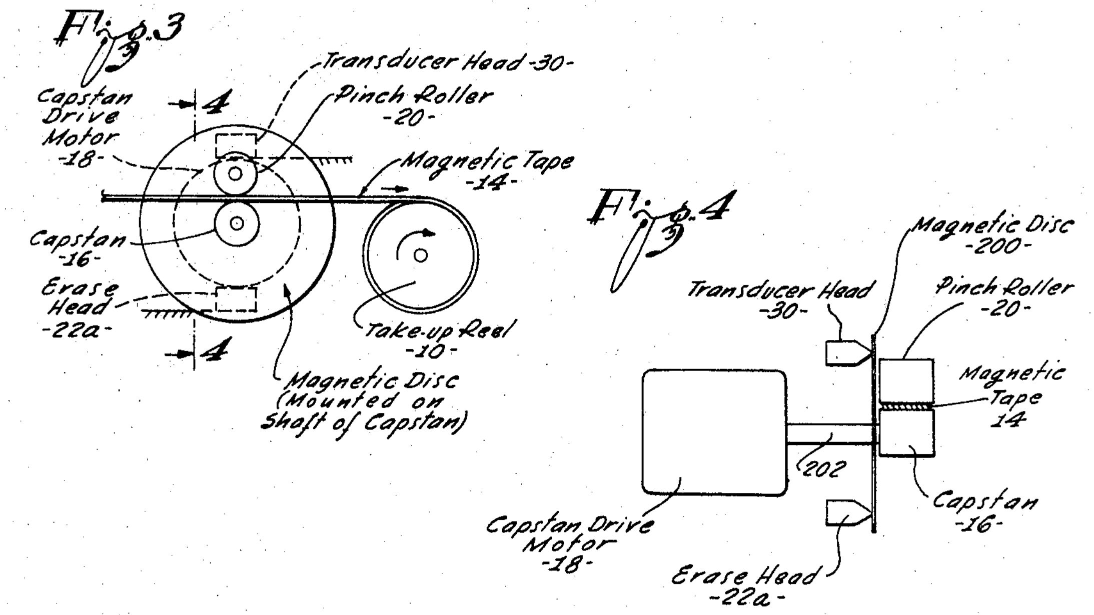
FIGURE 3 is a schematic representation of a second embodiment of the invention.
FIGURE 4 is a side view, partly in section, taken substantially along the line 4—4 of FIGURE 3.

In the modification of the invention shown in FIGURES 3 and 4, the combined record-reproduce head 30 is positioned to be coupled to a magnetic disc 200, rather than to the magnetic tape 14. The magnetic disc 200 is mounted on a drive shaft 202 which extends from the capstan drive motor 18 to the capstan 16. This disc, therefore, rotates with the rotation of the capstan.

An erase head **22*a* is provided, so that each pulse recorded on the disc 200 is erased after it has been read by the reproduce section of the combined unit 30. The circuitry associated with the record-reproduce unit 30 for providing a speed control for the capstan drive motor 18** may be similar to that described above.

It will be appreciated that the magnetic disc 200 may have any other suitable configuration, such as a drum, or other shape. Also, it will be appreciated that the invention is not limited to magnetic recording, and other types of recording media may be used.

The combined record-reproduce head 30 is illustrated in FIGURES 3 and 4 as being mounted in a manner such that the axis of the head extends perpendicularly to the direction of movement of the magnetic tape 14. With this positioning of the head 30, any spurious movements of the magnetic tape 14 normal to its direction of movement, due to bearing deficiencies and the like, and which movements have no affect on the recordings on the tape, do not affect the signals sensed by the unit 30 as is desired.

Figure 5:
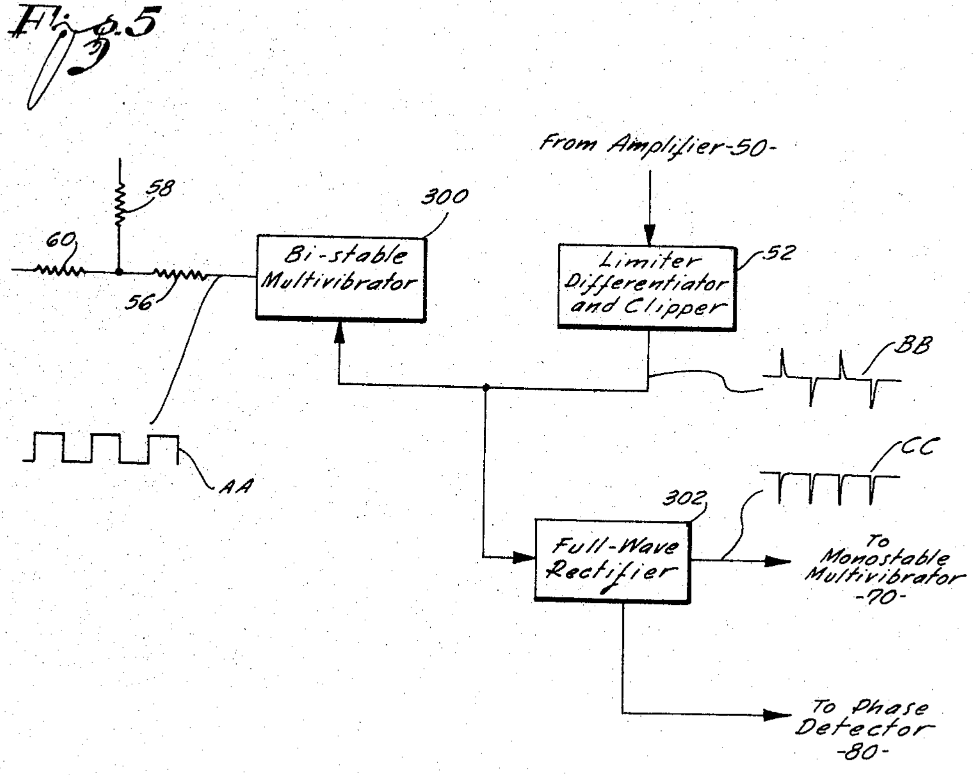
FIGURE 5 shows a modification to the system of FIGURE 1.

The system of FIGURE 1 can be modified in the manner shown in FIGURE 5. In the modified system, the inverter 54 is replaced by a bi-stable multivibrator 300. The multi-vibrator is triggered by the positive-going pulses, for example, from the unit 52.

The bi-stable multivibrator 300 causes a symmetrical rectangular wave AA to circulate through the system, instead of the pulses A and C in FIGURE 1. This rectangular wave is much easier to clip and limit accurately in the unit 52 than the single-polarity pulses.

In the modified system, the unit 52 produces both positive-going and negative-going differentiated pulses BB, as shown. As noted above, only the positive-going of these trigger the bi-stable multivibrator 300.

The modified system of FIGURE 5 also includes a full-wave rectifier 302. This rectifier may include known circuitry, and it responds to the signal BB to produce corresponding output pulses, all of the same polarity. For example, the full-wave rectifier produces negative-going pulses CC for application to the monostable multivibrator 70 and to the phase detector 80.

The invention provides, therefore, an improved speed control system which has special utility in conjunction with magnetic recorders. However, it will be appreciated that the speed control system has general application wherever a highly precise and accurate yet inexpensive indicator or control is required.

While particular embodiments of the invention have been shown and described, modifications may be made, and it is intended in the claims to cover all such modifications as fall within the scope of the invention.

What is claimed is:

1. A control system for use with a recording member constructed to receive and store a plurality of pulses at progressive positions on the member, said system including:

transducer means disposed in contiguous relationship to said recording member and including an energizing element, said transducer means being responsive to each of the pulses for recording such pulses on said recording member, said transducer means being responsive to each of the pulses recorded on said recording member for developing across said energizing element a signal having a greater time duration than the pulse;

first circuit means coupled to said energizing element and responsive to the signal developed in the energizing element for producing a pulse at a particular time in the generation of the signal;

second circuit means coupled to said first circuit means and to said energizing element for applying to said energizing element each of the pulses produced by the first circuit means;

further circuit means coupled to said first circuit means and responsive to the pulses produced by the first circuit means for producing a control signal having characteristics indicative of the relative movement of said recording member past said transducer means;

driving means for imparting relative movement between said recording member and said transducer means; and means coupled to said further circuit means and to said driving means for controlling the operation of said driving means in obtaining relative movement between said recording member and said transducer means in accordance with the characteristics of the control signal.

2. A control system for use with a movable recording member constructed to receive and store a plurality of pulses at progressive positions on the member;

transducer means disposed in contiguous relationship to said movable recording member and including an energizing element, said transducer means being responsive to each of the pulses for recording a corresponding pulse on said recording member, the transducer means being responsive to each of the pulses recorded on said recording member for developing in said energizing element a signal having an extended time duration relative to the duration of said pulse;

first circuit means coupled to said energizing element and responsive to each signal developed in said energizing element for producing a pulse at a particular time relative to the duration of the signal;

second circuit means coupled to said first circuit means for applying to said energizing element each pulse produced by the first circuit means;

third circuit means coupled to the energizing element for initially applying a pulse to the energizing element;

further circuit means coupled to said first circuit means and responsive to the pulses produced by the first circuit means for producing a control signal having characteristics indicative of the speed of said movable recording member;

driving means for said movable recording member; and means coupled to said further circuit means for operating upon the driving means in accordance with the characteristics of the control signal to control the speed of said recording member relative to said transducer means.

3. The system defined in claim 2 including gate circuit means connected to said second circuit means and said first circuit means for preventing the signal applied by said second circuit means to said energizing element from being introduced to said first circuit means.

4. The system defined in claim 2 including gate circuit means connected to the second circuit means and the first circuit means and responsive to each of the pulses applied to the energizing element for energizing the first circuit means to produce an output pulse in accordance with each signal developed in the energizing element.

5. A control system for use with a movable magnetic recording member constructed to receive and store a plurality of pulses at progressive positions on the member;

electro-magnetic transduced means magnetically coupled to said recording member and including an energizing coil, said transducer means being responsive to each of the pulses applied to said energizing coil for recording a corresponding pulse on said recording member, the transducer means being further responsive to each of the pulses recorded on said recording member for developing in said energizing coil a signal having an extended duration relative to the duration of each of the pulses;

first circuit means coupled to said energizing coil and responsive to each of the signals developed in the energizing coil for producing a pulse at the end of each signal;

second circuit means coupled to said first circuit means for applying to said energizing coil of said transducer means each of the pulses produced by the first circuit means;

gate circuit means connected to said second circuit means and said first circuit means for preventing the pulses applied to said energizing coil by said second circuit means from being applied to said first circuit means;

third circuit means coupled to said energizing coil for initially applying a pulse to said energizing coil;

further circuit means coupled to said first circuit means and responsive to each of the pulses developed by the first circuit means for producing a control signal having characteristics indicative of the speed of said movable recording member;

driving means for said movable recording member; and means coupled to said further circuit means and to said driving means for controlling the operation of said driving means in accordance with the characteristics of the control signal to maintain the movable recording member at a particular speed relative to the transducer means.

6. The control system defined in claim 5 wherein said electro-magnetic transducer means includes a magnetic core having an air gap across which said magnetic recording member is drawn by said driving means and wherein means are included in the gate circuit means for energizing the first circuit means in response to each of the pulses applied to the energizing coil to produce a pulse in accordance with each signal developed in the energizing coil.

7. A control system for use with a movable magnetic recording member constructed to receive and store a plurality of pulses at progressive positions on the magnetic member;

electro-magnetic transducer means magnetically coupled to said recording member and including an energizing coil, said transducer means being responsive to each of the pulses applied to said energizing coil for recording a corresponding pulse on said recording member, and said transducer means being responsive to each of the pulses recorded on said recording member for developing in said energizing coil a signal having substantially rectangular characteristics and a duration greater than that of the pulse recorded on the recording member;

first circuit means coupled to said energizing coil and responsive to each of the signals developed in said energizing coil for producing a pulse at the end of such signal;

second circuit means coupled to said first circuit means and responsive to each of the pulses from said first circuit means for applying such pulse to said energizing coil of said transducer means;

gate means interposed between said second circuit means and said first circuit means for preventing each of said pulses from said second circuit means from being applied to said first circuit means;

third circuit means coupled to said energizing coil for initially applying a pulse to said energizing coil;

further circuit means coupled to said first circuit means and responsive to the pulses produced by the first circuit means for producing a control signal having characteristics indicative of the speed of said movable recording member;

driving means for said movable recording member; and means coupled to said further circuit means for controlling the operation of said driving means in according with the characteristics of the control signal to regulate the movement of the recording member relative to said transducer means.

8. The control system of claim 7 in which said second circuit means includes a bi-stable multivibrator circuit which responds to the pulses from said second circuit means to provide for the passage of the rectangular signals from the energizing coil to the first circuit means for the production of the pulses by the first circuit means and to prevent the passage of the pulses from the second circuit means to the first circuit means.

9. The control system of claim 7 wherein said first circuit means produces pulses of positive and negative polarity and wherein said second circuit means includes a circuit for introducing to the energizing coil only the pulses of a particular one of the positive and negative polarities.

References Cited

UNITED STATES PATENTS

| | | | |
|---|---|---|---|
| 2,876,004 | 3/1959 | Sink | 179—100.2 X |
| 3,011,160 | 11/1961 | Gratian | 179—100.2 |
| 3,041,414 | 6/1962 | Gratian | 179—100.2 |
| 3,056,950 | 10/1962 | Birmingham et al. | 340—174.1 |
| 3,107,347 | 10/1963 | Huss | 179—100.2 |
| 3,267,448 | 8/1966 | Gunther | 340—174.1 |

BERNARD KONICK, *Primary Examiner.*

V. P. CANNEY, *Assistant Examiner.*